United States Patent [19]

Van derDrift et al.

[11] Patent Number: 5,713,708
[45] Date of Patent: Feb. 3, 1998

[54] FASTENER ASSEMBLY INCLUDING A SELF-LOCKING RATCHET NUT

[76] Inventors: Richard W. Van derDrift, 130 Magnolia Ave., Larkspur, Calif. 94939; Robert G. Ullrich, 2262 Clinton Ave., Alameda, Calif. 94501; Paul S. Turin, 2418 Grant St., Berkeley, Calif. 94703

[21] Appl. No.: 543,741

[22] Filed: Oct. 16, 1995

[51] Int. Cl.$^6$ ............................................. F16B 39/30
[52] U.S. Cl. ................... 411/208; 411/299; 411/300; 411/951; 411/329
[58] Field of Search ................ 411/206–209, 300, 411/329, 950, 951, 299

[56] References Cited

U.S. PATENT DOCUMENTS

| | | | |
|---|---|---|---|
| 589,599 | 9/1897 | Hardy | 411/299 |
| 625,667 | 5/1899 | Geer | 411/114 |
| 647,794 | 4/1900 | Benjamin | 411/299 |
| 718,336 | 1/1903 | Freund | 411/228 |
| 754,767 | 3/1904 | Hedrick | 411/207 |
| 785,528 | 3/1905 | Thompson | 411/329 |
| 1,104,731 | 7/1914 | Heimar | 411/299 |
| 1,207,313 | 12/1916 | Martinez | 411/299 |
| 1,247,794 | 11/1917 | Constable et al. | 411/299 |
| 1,829,017 | 10/1931 | Saben | 411/950 |
| 2,159,160 | 5/1939 | Horsch et al. | 411/114 |
| 4,762,452 | 8/1988 | Vogel | 411/207 |
| 5,460,468 | 10/1995 | Pistacio | 411/299 |
| 5,538,378 | 7/1996 | Van Der Drift | 411/329 |

FOREIGN PATENT DOCUMENTS 664962  1/1952  United Kingdom ............ 411/329

*Primary Examiner*—Rodney M. Lindsey
*Assistant Examiner*—Tuyet-Phuong Pham
*Attorney, Agent, or Firm*—Fay, Sharpe, Beall, Fagan, Minnich & McKee

[57] ABSTRACT

A self-locking nut designed to work with a male thread's that have a slot, keyway or hole along their threads. A novel locking ring (13) placed in a cavity (23) in one end of the nut. One or more fingers (24) on the locking ring lock into a slot, recess, hole or keyway in the male thread and multiple projections on the clip lock into recesses (22) in the female component. By locking the male component to the clip and the female component to the clip the device locks the male component to the female component.

8 Claims, 3 Drawing Sheets

5,713,708

FASTENER ASSEMBLY INCLUDING A SELF-LOCKING RATCHET NUT

BACKGROUND OF THE INVENTION

1. Field of the Invention

The present invention relates to a fastener assembly where a self-locking female threaded fastener is intended to secure itself to a threaded bolt, cylinder, stud, shank or screw that has a spline, slot, notch, or recess through or in its thread.

2. Description of the Related Art

Locking threaded fasteners and threaded connecting devices of a wide variety of types are available which reduce the tendency of male, generally cylindrical, threaded components from altering their position in relation to their corresponding female threaded component, thereby reducing the tendency of such threaded fasteners and threaded connecting devices to loosen and come apart in response to vibration, expansion, contraction and other movement. Many such fasteners function in this regard by increasing friction between the mated threads of the male and female components or between the fastener and the parts joined by the fastener. Examples include: lock washers, tooth washers, blind thread bores filled with resilient inserts, and screw thread profiles that jam or deform when tightened. Other such fasteners and connections function by increasing the friction between the engaging surfaces of the head of the male component and work piece, or between the female component and work piece.

In all such arrangements, the increased fiction makes rotation more difficult between the male and female components, thereby preventing inadvertent release or loosening of the male and female components. A drawback of all these approaches is that the male and female components can loosen at any axial pressure or tension less than that required to strip the male component out of the female component, since the threads in each case fall away in the direction of axial pressure or tension, a portion of such pressure or tension is translated into a rotational force tending to loosen the components. Also, fasteners using these approaches generally require high torque to install, mar the joint surface, are not reusable, or require greater loads to be effective than is desirable to apply to some joints. Self-locking accessories such as cotter pins, lock wires, and nut assemblies comprising a first working nut and a second locking nut part have the drawback of requiring additional installation steps.

Therefore, there is a need for threads, threaded fasteners, and threaded devices: (i) that will not come loose under loads equal or less than the loads the fastener supports, (ii) that can be easily installed using conventional tools, (iii) that employ torque values appreciably closer to those torque values necessary only to clamp together the workpieces (as opposed to requiring higher torque values to provide increased resistance against loosening), and (iv) that can be installed as easily as standard fasteners. The present invention addresses these drawbacks in known prior threaded fasteners and threaded devices and meets these needs with a novel locking ring placed in a cavity in one end of the nut. One or more fingers on the locking ring lock into a slot, recess, hole or keyway in the male thread and multiple projections on the clip, lock into recesses in the female component. By locking the male component to the clip and the female component to the clip the device locks the male component to the female component.

REFERENCE NUMERALS IN THE DRAWINGS

11—male component
12—female component
13—locking ring
21—male component's keyway
22—female component's recess
23—female component's ring cavity
24—locking ring's finger
25—locking ring's projection

DETAILED DESCRIPTION OF THE PREFERRED EMBODIMENT

Figure 1A:
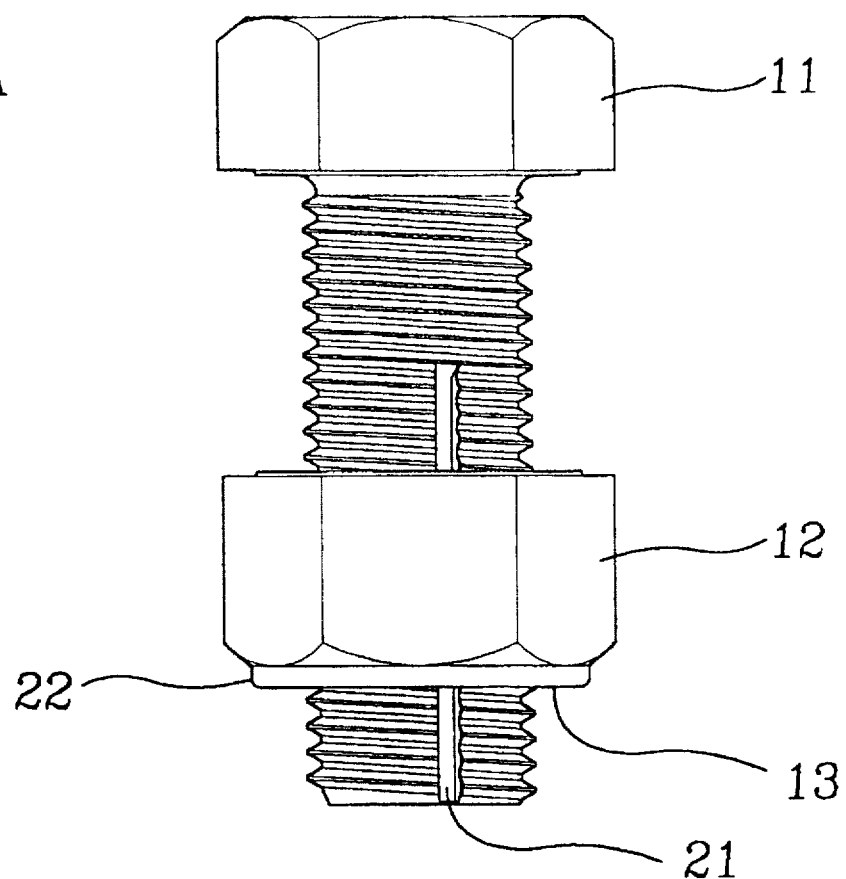
FIG. 1A is a side view of the invention in an assembled state.
Figure 1B:
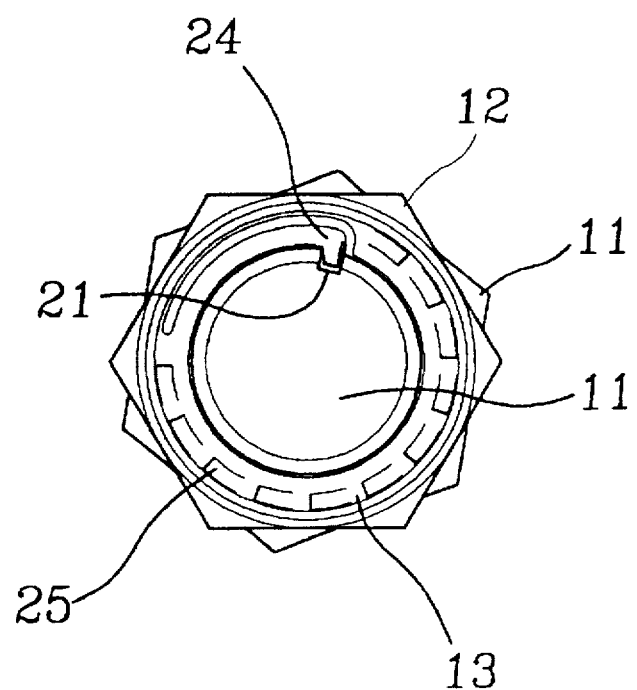
FIG. 1B is an end view of the invention in an assembled state showing the flexible thread finger of the female component interacting with the thread keyway of the male component.

FIG. 1A shows a side view and FIG. 1B an end view of a self-locking threaded connection, in an assembled state, comprised of a male component (11) having a longitudinally extending slot, recess, hole or keyway (21) (hereafter referred to as the "keyway"), and a female component (12) with a cavity (23) for holding a locking ring (13). The locking ring is held within the female component's cavity in a manner that enables it to rotate within the cavity. In particular, as seen in FIG. 2B, the preferred embodiment uses a lip or flange (23a) that is deformed over the locking ring (13) to hold it in place while permitting rotation.

The locking ring is designed to work with the keyway of the male component and recesses (22 of FIG. 3A) in the female component's cavity so that, as the male component is being screwed into or out of the female component, the locking ring engages the male component and female component in a novel manner and thereby prevent the assembled fastener from inadvertently loosening due to vibration and shocks (hereafter referred to as "locking").

Figure 2A:
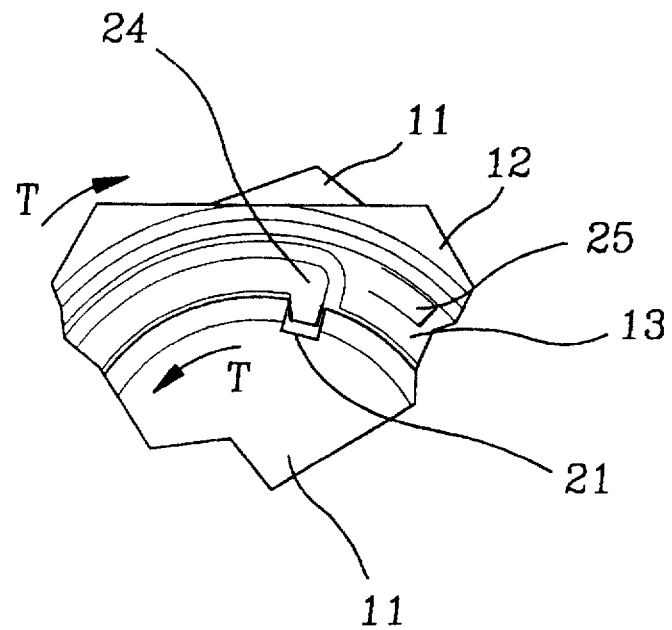
FIG. 2A is a detail end view of a male thread segment with the female component's ring finger positioned in the male thread's keyway.
Figure 2B:
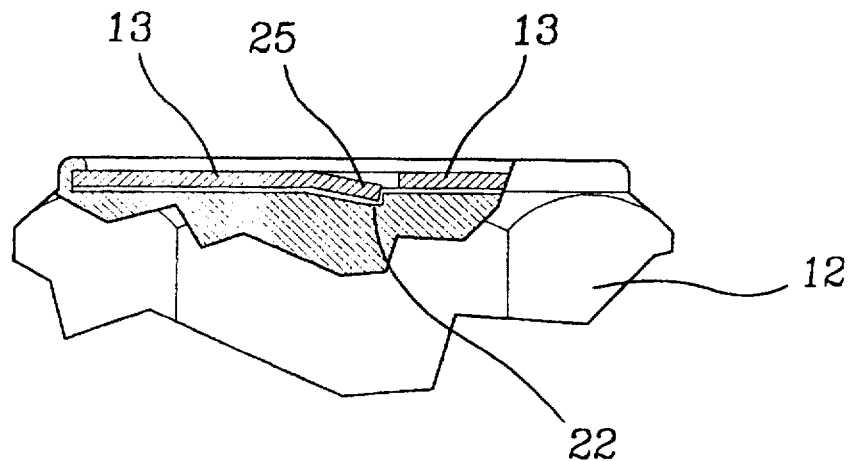
FIG. 2B is a detail side view of one of the female component's recesses and one of the female component's ring projections positioned in the recess.

FIG. 2A is an end view of the locking ring's finger (24) positioned within the male component's keyway (21). FIG. 2B is a side view of one of a locking ring's flexible projections (25) positioned within one of a female component's recesses (22). The arrows (T) point in the direction the parts move when the fastener is tightened. The dashed lines indicate that a feature appears only intermittently from the given perspective. The tip of the locking ring's finger that comes into contact with the side of the keyway (21) when the fastener is rotated in the tightening direction is shaped So that once engaged within the keyway it cannot be disengaged by rotating either the male or female component in the tightening direction without permanently damaging either the keyway (21) or the finger (24). The tip of the locking ring's finger (24) that comes into contact with the side of the keyway when the fastener is rotated in the loosening direction is shaped so that sustained torque in the loosening direction can overcome the spring force urging the finger into the keyway and disengage the finger from the keyway (21). As illustrated, the end of the finger (24) has an inclined surface (24a) that engages the edge of the keyway (21) such that at a predetermined torque level in the loosening direction, it rides out of the keyway (21). The female component's recesses (22) and the locking ring's projections (25) are shaped so that once at least one of them is engaged, it cannot be disengaged by rotating either the male or female component in the loosening direction without permanently damaging either the recess (22) or the engaged locking ring projection (25). The recesses (22) and projections (25) are shaped so that sustained torque in the tightening direction can disengage the projection from the recess by either pushing the ring and its projection up and out of the way or by forcing the projection to flex upward and out of the recess.

Figure 3A:
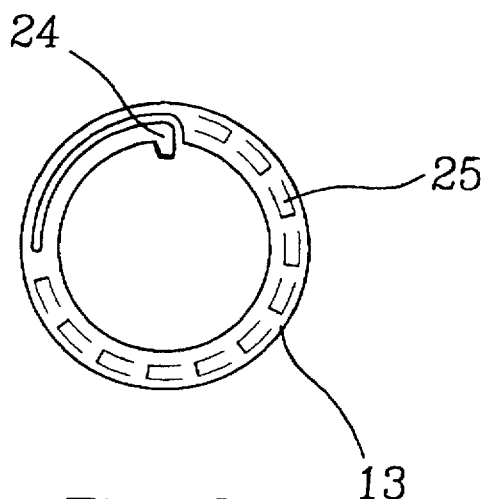
FIG. 3A is an end view of the female fastening component's recesses according to a preferred embodiment of the present invention.
Figure 3B:
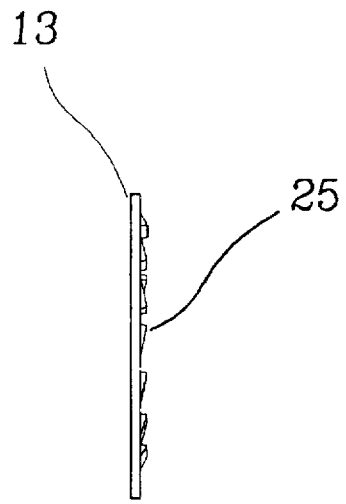
FIG. 3B is a side view of the female fastening component's recesses according to a preferred embodiment of the present invention.
Figure 3C:
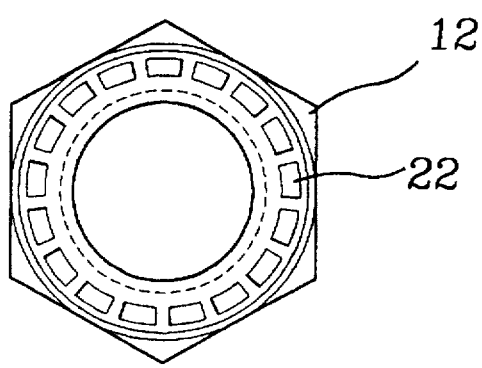
FIG. 3C is an end view of the female component's locking ring according to a preferred embodiment of the present invention.
Figure 3D:
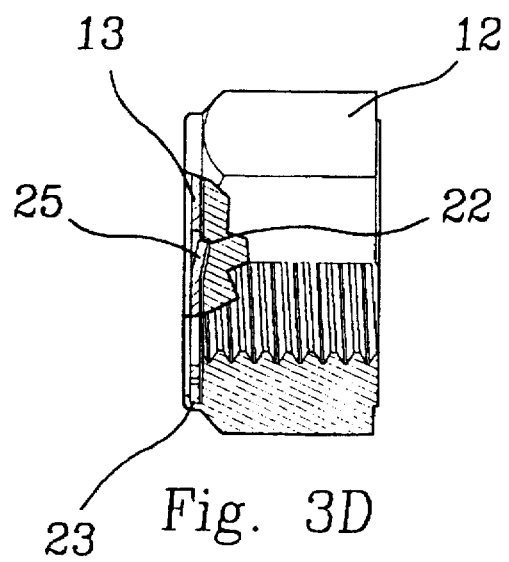
FIG. 3D is a side view of the female component's locking ring according to a preferred embodiment of the present invention.

FIG. 3A is an end view of the female component (12) without the locking ring (13), and FIG. 3B is a side view with the ring (13) in position. The female component's cavity (23) is large enough to hold the the locking ring snugly in the axial direction and tightly enough in the radial direction so that the locking ring's projections (25) are forced into the female component's recesses (22). The female component's recesses can be placed anywhere in the cavity as long as they align with the locking ring's projections. In the preferred embodiment, they are along the radial outer area of the cavity. FIG. 3C is an end view of the locking ring (13), and FIG. 3D is its side view. The inner diameter of the locking ring measured from the tip of the finger (24) is less than the minor diameter of the male component. The inner diameter of the locking ring between any two points other than the tip of the finger is greater than the major diameter of the male component. The finger is long enough so that it can flex at least the height of one thread rotation of the male component so that as the female component is threaded onto the male component, the finger can flex radially away from the head of the male until the tip of the finger aligns with the keyway or the lead-in (runout) of the male thread. The number and positioning of the female component's recesses (22) and the locking ring projections (25) are such that the recesses and projections align synchronously and at least one projection is always within a few degrees of a recess.

The female component can be easily rotated onto the male component because even after the locking ring's finger (24) snaps into the keyway (21), the locking ring can rotate within the female component's cavity. As the female component is rotated further onto the male component, the finger (24) remains in the keyway (21) and the ring (13) moves without rotating axially up the male component with the female component. When the female component is subsequently rotated in the loosening direction, the finger remains positioned in the keyway and the locking ring does not rotate with the female component. When the end of a projection (25) aligns with the side of a recess (22), the projection digs into the side of the recess and prevents the locking ring from rotating within the female component's cavity. At this point, the female component is locked to the male component.

Once locked, sufficient additional higher torque in the loosening direction unlocks the finger from the keyway.

Traditional threaded fasteners subjected to dynamic loads, stress reversals or vibration are susceptible to loosening. Tightening such fasteners develops axial tensile stress that creates frictional resistance to loosening between mated threads and between bolt and nut surfaces bearing against the joined materials. This same tensile stress in the bolt also encourages the mating threads to slip due to the "downward" slope of their helix angle. In the current invention, for the mating threads to slip even as vibration reduces resistance, the axial tensile stress must also lift or force the locking ring's finger (24) out of the male thread's keyway (21) and to overcome any remaining friction. To push or lift a finger out of the keyway, the loosening torque resulting from tensile stress must be great enough to overcome the natural spring return action pushing the finger into the keyway. To ensure that the loosening torque is less than these resistive forces, the finger's tension is engineered to create sufficient resistance to prevent inadvertently loosening of the fastener.

In alternative embodiments, the faces of the finger can be formed so that they dig into the recesses when torque is applied in either the tightening or loosening directions. In such embodiments, the fasteners cannot be loosened without damaging the fastener. While the present invention has been described with reference to certain preferred embodiments, those skilled in the art will recognize that various modifications may be provided. For example, there are many other embodiments having a variety of configurations for the shape, angle, position, number and size of the fingers, projections and recesses. These and other variations upon, and modifications to, the preferred embodiment are provided for by the present invention which is only limited by the following claims.

We claim:

1. A threaded fastening device comprising:
   a. a female fastening member comprising a first body having an internal thread and an annular cavity with at least one recess in the cavity, and a ring shaped second body axially secured in the cavity of the first body for rotation therein;
   b. a male threaded fastening member having an external thread on which the internal thread of the first body is received, and a keyway extending longitudinally of the male threaded fastening member; and,
   c. said ring shaped second body having at least one finger with spring return action and an end extending toward the axis of the first body's internal thread with a point on the end of the finger shaped to prevent disengagement from the keyway of the male threaded fastener when rotated in a tightening direction and shaped to allow disengagement when rotated in a loosening direction under a predetermined torque,
   d. and said ring further having at least one projection to engage the said at least one recess when aligned therewith and said projection shaped to prevent disengagement of said projection from the at least one recess when rotated in the loosening direction and shaped to allow disengagement when rotated in the tightening direction.

2. The threaded fastening device of claim 1 wherein there are a plurality of recesses in the cavity and a plurality of said projections on said ring, said projections shaped so that when the end of a projection is forced into a recess, the ring must rotate with the first body when said first body is rotated in a loosening direction.

3. The threaded fastening device of claim 1 wherein the finger includes a first face for engaging the keyway, said face shaped so that the face can glide by the keyway when urged toward the keyway under a predetermined torque in the loosening direction.

4. The threaded fastening device of claim 1 wherein the finger includes a second face for engaging the keyway, said second face shaped so that the finger cannot glide by the keyway when urged toward the keyway with torque in a tightening direction.

5. A threaded female fastening device comprising:

a first body having an internal thread for threading the first body onto a male threaded fastening member;

an annular cavity formed in the first body with at least one recess in the cavity;

a ring shaped second body secured within the annular cavity and rotatable therein;

at least one resilient finger extending from the ring for engagement with a keyway of the male threaded fastening member; and at least one projection formed on the ring for engagement with the at least one recess in the cavity, said projection shaped to prevent disengagement from the at least one recess when rotated in a loosening direction and shaped to allow disengagement when rotated in the tightening direction.

6. The threaded female fastening device of claim 5 wherein a lip is formed on the first body which prevents the ring from being removed from the annular cavity.

7. The threaded female fastening device of claim 5 wherein an end of the at least one finger is shaped so that disengagement from the keyway is prevented when the female threaded fastening device is rotated in the tightening direction and disengagement is allowed when the female threaded fastening device is rotated in the loosening direction under a predetermined torque.

8. The threaded female fastening device of claim 5 wherein the ring shaped second body is rotatable within the annular cavity in a first direction and is non-rotatable in a second direction due to engagement of the at least one projection with the at least one recess.

* * * * *